US008620907B2

(12) United States Patent
Risvik et al.

(10) Patent No.: US 8,620,907 B2
(45) Date of Patent: Dec. 31, 2013

(54) MATCHING FUNNEL FOR LARGE DOCUMENT INDEX

(75) Inventors: Knut Magne Risvik, Mo I Rana (NO);
Michael Hopcroft, Kirkland, WA (US);
John G. Bennett, Bellevue, WA (US);
Karthik Kalyanaraman, Bellevue, WA (US); Trishul Chilimbi, Seattle, WA (US); Chad P. Walters, Bellevue, WA (US); Jan Otto Pedersen, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/951,528

(22) Filed: Nov. 22, 2010

(65) Prior Publication Data

US 2012/0130994 A1    May 24, 2012

(51) Int. Cl.
*G06F 7/00* (2006.01)
(52) U.S. Cl.
USPC .......................................................... 707/723
(58) Field of Classification Search
USPC .......................................................... 707/723
See application file for complete search history.

(56) References Cited

U.S. PATENT DOCUMENTS

| 4,769,772 | A  | 9/1988  | Dwyer |
| 5,193,180 | A  | 3/1993  | Hastings |
| 5,640,487 | A  | 6/1997  | Lau et al. |
| 5,983,216 | A  | 11/1999 | Kirsch et al. |
| 6,167,397 | A  | 12/2000 | Jacobson et al. |
| 6,173,298 | B1 | 1/2001  | Smadja |
| 6,507,829 | B1 | 1/2003  | Richards et al. |
| 6,571,251 | B1 | 5/2003  | Koski et al. |
| 6,704,729 | B1 | 3/2004  | Klein et al. |
| 6,807,545 | B1 | 10/2004 | VanDamme |
| 6,901,411 | B2 | 5/2005  | Li et al. |
| 7,039,631 | B1 | 5/2006  | Finger, II |
| 7,072,889 | B2 | 7/2006  | Ogawa |
| 7,152,064 | B2 | 12/2006 | Bourdoncle et al. |

(Continued)

FOREIGN PATENT DOCUMENTS

| CN | 101388026 | 3/2009 |
| CN | 101393565 | 3/2009 |

OTHER PUBLICATIONS

Zhaohui Zheng, et al. Query-Level Learning to Rank Using Isotonic Regression—Pub. Date: Sep. 26, 2008 http://ieeexplore.ieee.org/stamp/stamp.jsp?arnumber=04797684.

(Continued)

*Primary Examiner* — Jensen Hu
(74) *Attorney, Agent, or Firm* — Shook Hardy & Bacon LLP

(57) ABSTRACT

Search results are identified and returned in response to search queries by evaluating and pruning candidate documents in multiple stages. The process employs a search index that indexes atoms found in documents and pre-computed scores for document/atom pairs. When a search query is received, atoms are identified from the search query and a reformulated query is generated based on the identified atoms. The reformulated query is used to identify matching documents, and a preliminary score is generated for matching documents using a simplified scoring function and pre-computed scores in the search index. Documents are pruned based on preliminary scores, and the remaining documents are evaluated using a final ranking algorithm that provides a final set of ranked documents, which is used to generate search results to return in response to the search query.

20 Claims, 5 Drawing Sheets

(56) References Cited

U.S. PATENT DOCUMENTS

| | | | |
|---|---|---|---|
| 7,305,385 B1 | 12/2007 | Dzikiewicz et al. | |
| 7,330,857 B1 | 2/2008 | Svingen et al. | |
| 7,421,418 B2 | 9/2008 | Nakano | |
| 7,433,893 B2 | 10/2008 | Lowry | |
| 7,593,934 B2 | 9/2009 | Li et al. | |
| 7,596,745 B2 | 9/2009 | Dignum et al. | |
| 7,693,813 B1 | 4/2010 | Cao et al. | |
| 7,702,614 B1 | 4/2010 | Shah et al. | |
| 7,761,407 B1 | 7/2010 | Stern | |
| 7,765,215 B2 | 7/2010 | Hsu et al. | |
| 7,783,644 B1 | 8/2010 | Petrou et al. | |
| 7,792,846 B1 | 9/2010 | Raffill et al. | |
| 8,166,203 B1 | 4/2012 | Yang | |
| 2002/0032772 A1 | 3/2002 | Olstad | |
| 2002/0091671 A1 | 7/2002 | Prokoph | |
| 2002/0129015 A1 | 9/2002 | Caudill et al. | |
| 2003/0191737 A1 | 10/2003 | Steele et al. | |
| 2004/0044952 A1 | 3/2004 | Jiang et al. | |
| 2004/0098399 A1* | 5/2004 | Risberg et al. | 707/100 |
| 2004/0133557 A1 | 7/2004 | Wen et al. | |
| 2005/0210383 A1 | 9/2005 | Cucerzan | |
| 2006/0018551 A1* | 1/2006 | Patterson | 382/229 |
| 2006/0020571 A1 | 1/2006 | Patterson | |
| 2006/0080311 A1 | 4/2006 | Potok et al. | |
| 2006/0155690 A1 | 7/2006 | Wen et al. | |
| 2006/0195440 A1* | 8/2006 | Burges et al. | 707/5 |
| 2006/0248066 A1 | 11/2006 | Brewer | |
| 2007/0040813 A1 | 2/2007 | Kushler et al. | |
| 2007/0078653 A1 | 4/2007 | Olsen | |
| 2007/0150467 A1 | 6/2007 | Beyer et al. | |
| 2007/0250501 A1 | 10/2007 | Grubb | |
| 2008/0027912 A1 | 1/2008 | Liu et al. | |
| 2008/0027920 A1 | 1/2008 | Schipunov et al. | |
| 2008/0028010 A1 | 1/2008 | Ramsey | |
| 2008/0059187 A1 | 3/2008 | Roitblat et al. | |
| 2008/0059489 A1 | 3/2008 | Han et al. | |
| 2008/0082520 A1 | 4/2008 | Bohn et al. | |
| 2008/0114750 A1 | 5/2008 | Saxena et al. | |
| 2008/0208836 A1 | 8/2008 | Zheng et al. | |
| 2008/0216715 A1 | 9/2008 | Langford | |
| 2008/0294634 A1 | 11/2008 | Fontoura et al. | |
| 2009/0012956 A1 | 1/2009 | Wen et al. | |
| 2009/0070322 A1* | 3/2009 | Salvetti et al. | 707/5 |
| 2009/0083262 A1 | 3/2009 | Chang et al. | |
| 2009/0106232 A1 | 4/2009 | Burges | |
| 2009/0112843 A1 | 4/2009 | Hsu | |
| 2009/0132515 A1 | 5/2009 | Lu et al. | |
| 2009/0187550 A1 | 7/2009 | Mowatt et al. | |
| 2009/0187555 A1 | 7/2009 | Liu et al. | |
| 2009/0216715 A1 | 8/2009 | Dexter | |
| 2009/0216740 A1 | 8/2009 | Ramakrishnan et al. | |
| 2009/0248669 A1 | 10/2009 | Shetti et al. | |
| 2009/0254523 A1 | 10/2009 | Lang et al. | |
| 2009/0327266 A1* | 12/2009 | Tankovich et al. | 707/5 |
| 2009/0327274 A1 | 12/2009 | Kejariwal et al. | |
| 2010/0057718 A1 | 3/2010 | Kulkarni | |
| 2010/0082617 A1 | 4/2010 | Liu et al. | |
| 2010/0114561 A1 | 5/2010 | Yasin | |
| 2010/0121838 A1 | 5/2010 | Tankovich et al. | |
| 2010/0138426 A1 | 6/2010 | Nakayama et al. | |
| 2010/0179933 A1 | 7/2010 | Bai et al. | |
| 2010/0198857 A1 | 8/2010 | Metzler et al. | |
| 2010/0205172 A1* | 8/2010 | Luk | 707/715 |
| 2010/0318519 A1 | 12/2010 | Hadjieleftheriou et al. | |

OTHER PUBLICATIONS

Gui-Rong Zue Ke Zhou, et al., Learning to Rank with Ties—Pub. Date: Jul. 24, 2008 http://sites.google.com/site/archkzhou/home/p275-zhou.pdf.

Tao Qin, et al., Learning to Rank Relational Objects and its Application to Web Search—Pub. Date: Apr. 25, 2008 http://www2008.org/papers/pdf/p407-qinA.pdf.

Andrew Cencini, SQL Server 2005 Full-Text Search: Internals and Enhancements—Pub. Date: Dec. 2003 http://msdn.microsoft.com/en-us/library/ms345119%/28SQL.90%29.aspx.

Mark Bennett, Do You Need Synthetic Tokens? (part 2)—Published Date: Dec. 2009 http://www.ideaeng.com/tabld/98/itemld/209/Do-You-Need-Synthetic-Tokens-part-2.aspx.

Steven Burrows, et al., Efficient and Effective Plagiarism Detection for Large Code Repositories—Pub. Date: 2004 http://www.cs.berkeley.edu/~benr/publications/auscc04/papers/burrows-auscc04.pdf.

Andrew Kane, Simulation of Distributed Search Engines: Comparing Term, Document and Hybrid Distribution—Published Date: Feb. 18, 2009 http://www.cs.uwaterloo.ca/research/tr/2009/CS-2009-10.pdf.

Lei Zheng, et al., Document-Oriented Pruning of the Inverted Index in Information Retrieval Systems—Pub. Date: 2009 http://ieeexplore.ieee.org/stamp/stamp.jsp?tp=&arnumber=5136730.

Ahmad Abusukhon, et al., Comparison Between Document-based, Term-based and Hybrid Partitioning—Pub. Date: Aug. 4, 2008 http://ieeexplore.ieee.org/stamp/stamp.jsp?arnumber=04664324.

Chunqiang Tang, et al., Hybrid Global-Local Indexing for Efficient Peer-To-Peer Information Retrieval—Pub. Date: 2004 http://citeseerx.ist.psu.edu/viewdoc/download?doi=10.1.1.81.5268&rep=rep1&type=ps.

Kuansan Wang, et al., Multi-Style Language Model for Web Scale Information Retrieval—Pub. Date: Jul. 23, 2010 http://research.microsoft.com/en-us/um/people/jfgao/paper/fp580-wang.pdf.

David Carmel, et al., Juru at TREC 10—Experiments with Index Pruning RD—Retrieved Date: Aug. 12, 2010 http://citeseerx.ist.psu.edu/viewdoc/download?doi=10.1.1.81.6833&rep=rep1&type=pdf.

Using and storing the index—Retrieved Date: Aug. 13, 2010 http://www.cs.princeton.edu/courses/archive/spring10/cos435/Notes/indexing_topost.pdf.

Matthias Bender, et al., Design Alternatives for Large-Scale Web Search: Alexander was Great, Aeneas a Pioneer, and Anakin has the Force—Retrieved Date: Aug. 16, 2010 http://qid3.mmci.uni-saarland.de/publications/Isds2007.pdf.

Parallel Information Retrieval—Retrieved Date: Aug. 16, 2010 http://www.ir.uwaterloo.ca/book/14-parallel-information-retrieval.pdf.

Diego Puppin, et al., Query-Driven Document Partitioning and Collection Selection—Retrieved Date: Aug. 16, 2010 http://citeseerx.ist.psu.edu/viewdoc/download?doi=10.1.1.101.6421&rep=rep1&type=pdf.

Ohm Sornil, et al., Hybrid Partitioned Inverted Indices for Large-Scale Digital Libraries—Retrieved Date: Aug. 16, 2010 http://ncsi-net.ncsi.iisc.ernet.in/gsdl/collect/icco/index/assoc/HASH472d.dir/doc.pdf.

International Search Report and Written Opinion in PCT/US2011/059834, mailed May 23, 2012.

Final Office Action in U.S. Appl. No. 13/045,278, mailed Jul. 19, 2012.

Ganti, et al., "Precomputing Search Features for Fast and Accurate Query Classification," In: Third ACM International Conference on Web Search and Data Mining, Feb. 4-6, 2010, 10 pages, New York City, NY.

Tandon, et al., "Information Extraction from Web-Scale N-Gram Data," In: Special Interest Group on Information Retrieval Web N-Gram Workshop, 2010, 8 pages.

Zobel, et al., "Finding Approximate Matches in Large Lexicons," Software—Practice and Experience, Mar. 1995, by John Wiley & Sons, Ltd., pp. 331-345, vol. 25, Issue 3, Australia.

Pike, et al., "Interpreting the Data: Parallel Analysis with Sawzall," In Scientific Programming—Dynamic Grids and Worldwide Computing, vol. 13, Issue 4, 2005, pp. 1-33.

Shah, et al., "Flux: An Adaptive Partitioning Operator for Continuous Query Systems," 19th International Conference on Data Engineering (ICDE'03), 2003, 16 pages.

Tamura, et al., "Parallel Database Processing on a 100 Node PC Cluster: Cases for Decision Support Query Processing and Data Mining," in Proceedings of the 1997 ACM/IEEE conference on Supercomputing (CDROM), 1997, 16 pp.

Non-Final Office Action mailed Jan. 31, 2012, in U.S. Appl. No. 13/045,278.

Non-Final Office Action mailed Apr. 5, 2012, in U.S. Appl. No. 12/951,747.

(56) References Cited

OTHER PUBLICATIONS

Non-Final Office Action mailed Apr. 17, 2012, in U.S. Appl. No. 12/951,815.

Non-Final Office Action mailed Apr. 13, 2012 in U.S. Appl. No. 12/951,799.

International Search Report and Written Opinion in PCT/US2011/059650, mailed Apr. 10, 2012.

Non-Final Office Action in U.S. Appl. No. 12/951,747, mailed Nov. 1, 2012.

Final Office Action in U.S. Appl. No. 12/951,747, mailed Apr. 9, 2013, 16 pages.

Final Office Action in U.S. Appl. No. 12/951,815, mailed Apr. 10, 2013, 14 pages.

Final Office Action in U.S. Appl. No. 13/072,419, mailed Aug. 9, 2013, 45 pages.

* cited by examiner

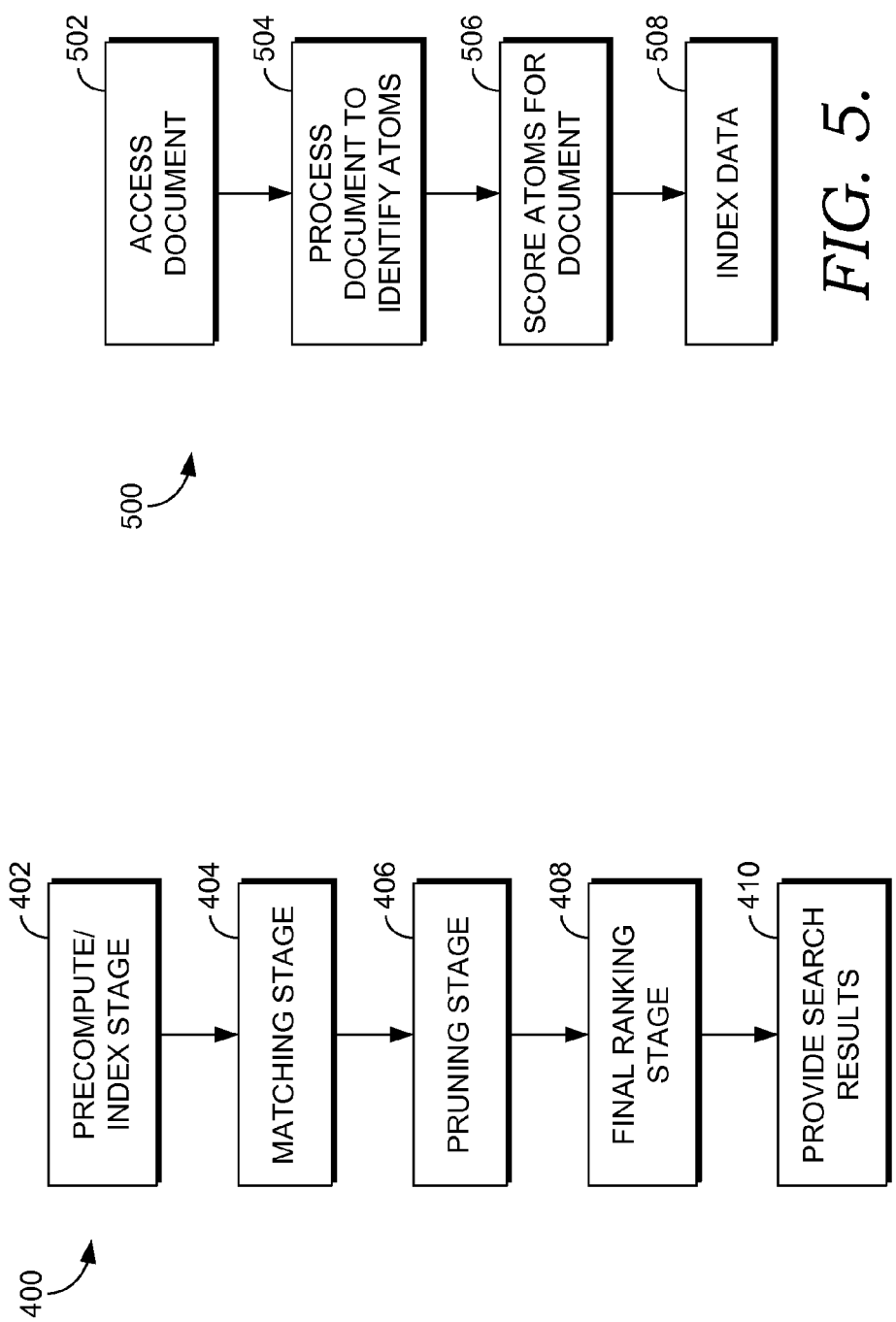

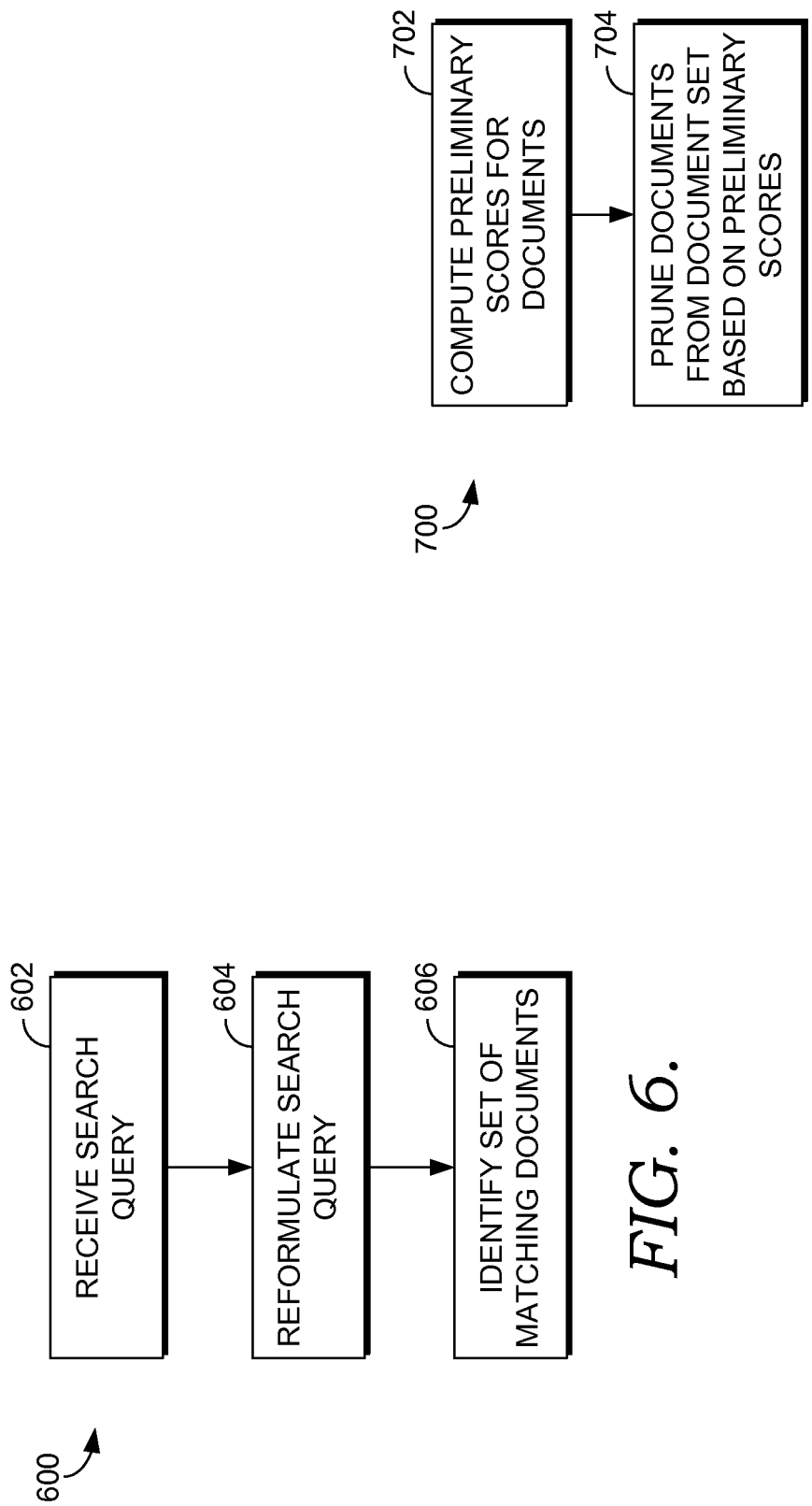

MATCHING FUNNEL FOR LARGE DOCUMENT INDEX

CROSS-REFERENCE TO RELATED APPLICATIONS

This application is related by subject matter to the inventions disclosed in the following commonly assigned applications filed on even date herewith: U.S. application Ser. No. 12/951,799, entitled "TIERING OF POSTING LISTS IN SEARCH ENGINE INDEX"; U.S. application Ser. No. 13/932,866, entitled "DECOMPOSABLE RANKING FOR EFFICIENT PRECOMPUTING"; U.S. application Ser. No. 12/951,747, entitled "EFFICIENT FORWARD RANKING IN A SEARCH ENGINE"; and U.S. application Ser. No. 12/951,815, entitled "HYBRID DISTRIBUTION MODEL FOR SEARCH ENGINE INDEXES". Each of the aforementioned applications is herein incorporated by reference in its entirety.

BACKGROUND

The amount of information and content available on the Internet continues to grow rapidly. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

Search engines operate by crawling documents and indexing information regarding the documents in a search index. When a search query is received, the search engine employs the search index to identify documents relevant to the search query. Use of a search index in this manner allows for fast retrieval of information for queries. Without a search index, a search engine would need to search the corpus of documents to find relevant results, which would take an unacceptable amount of time.

As the Internet continues to grow, the number of searchable documents that may be crawled and indexed in a search index has become extremely large. As a result, it has not been feasible for search engines to index information regarding all web documents. For instance, an inordinate amount of hardware storage would be required. Additionally, the processing time required to retrieve results from an extremely large index would be unacceptable. Nonetheless, search engines strive to index as many documents as feasible to provide search results to any query while being cost-effective and able to provide relevant results in amount of time that is acceptable to end users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a staged process for providing search results in response to search queries by evaluating and pruning candidate documents in various stages. Initially, a search index may be generated by identifying atoms in documents and pre-computing scores for document/atom pairs. When a search query is received, the search query may be reformulated by identifying atoms in the search query and generating a reformulated query based on the identified atoms. The search index may be queried using the reformulated query to identify matching documents. A preliminary score may be generated for the matching documents using a simplified scoring function and the pre-computed scores stored in the index. A pruned set of documents may be retained based on the preliminary scores. Documents in the pruned set may then be evaluated using a full ranking algorithm to generate a set of ranked documents, which is used to generate search results that are returned in response to the search query.

BRIEF DESCRIPTION OF THE DRAWINGS

The present invention is described in detail below with reference to the attached drawing figures, wherein:

FIG. 4 is a flow diagram showing a method for a staged process to return search results in response to a search query in accordance with an embodiment of the present invention;

FIG. 5 is a flow diagram showing a method for generating a search index during a pre-compute/index stage in accordance with an embodiment of the present invention;

FIG. 6 is a flow diagram showing a method for identifying an initial set of matching documents during a matching phase in accordance with an embodiment of the present invention; and FIG. 7 is a flow diagram showing a method for pruning documents from an initial set of matching documents during a pruning phase in accordance with an embodiment of the present invention.

DETAILED DESCRIPTION

Figure 1:
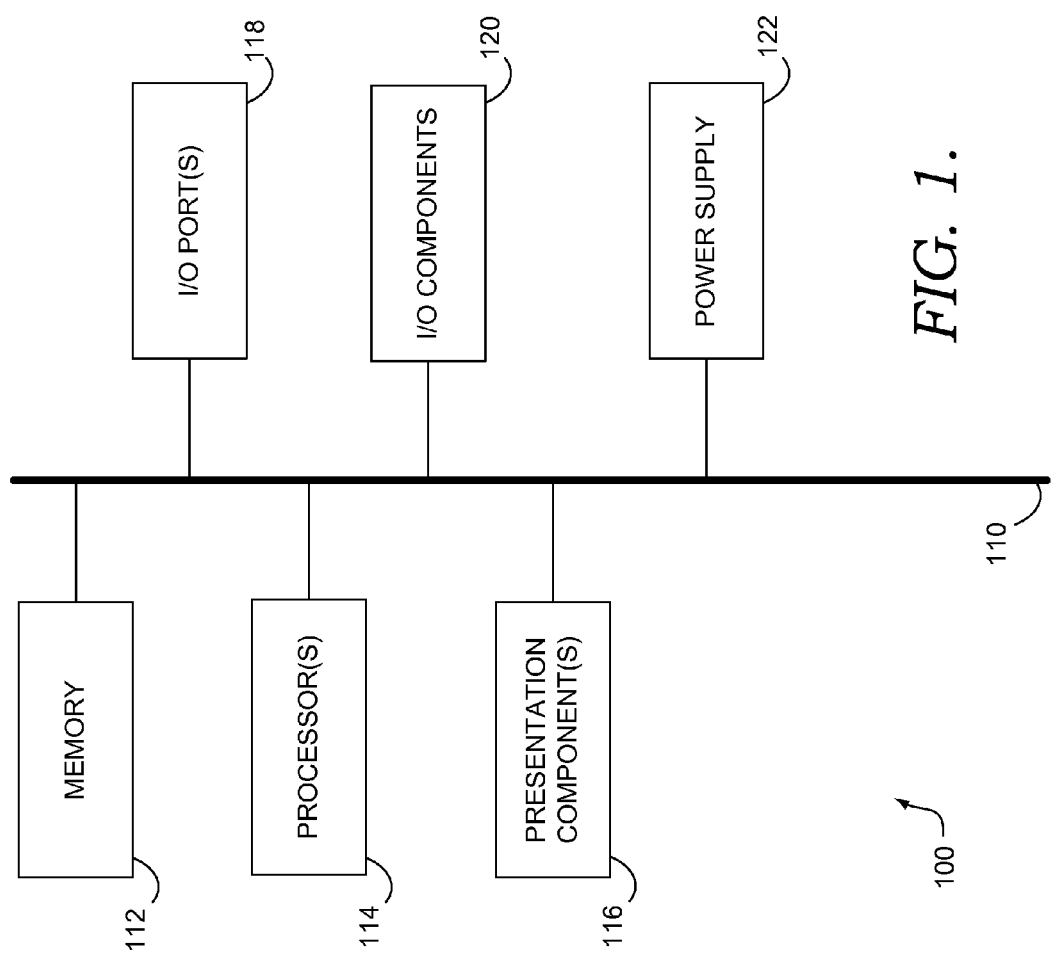
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide an indexing and searching process that allows for a large number of documents to be indexed and searched in a cost-effective manner and that meets strict latency constraints. In accordance with embodiments of the present invention, a process is employed that evaluates and prunes away document candidates in multiple stages. Conceptually, the process looks like a funnel as document candidates are evaluated and pruned away as the analysis becomes more complex through the stages. As the process continues through the stages, more expensive computations are applied and the number of candidate documents may be reduced by multiple orders of magnitude. Different strategies are applied at each of the stages to allow a quick and efficient approach to returning search results from a large number of documents. Additionally, the strategies used at each stage may be designed to complement the strategies used at other stages to make the process more efficient.

The search index employed by embodiments of the present invention indexes higher order primitives or "atoms" from documents, as opposed to simply indexing single terms. As used herein, an "atom" may refer to a variety of units of a query or a document. These units may include, for example, a term, an n-gram, an n-tuple, a k-near n-tuple, etc. A term maps down to a single symbol or word as defined by the particular tokenizer technology being used. A term, in one embodiment is a single character. In another embodiment, a term is a single word or grouping of words. An n-gram is a sequence of "n" number of consecutive or almost consecutive terms that may be extracted from a document. An n-gram is said to be "tight" if it corresponds to a run of consecutive terms and is "loose" if it contains terms in the order they appear in the document, but the terms are not necessarily consecutive. Loose n-grams are typically used to represent a class of equivalent phrases that differ by insignificant words (e.g., "if it rains I'll get wet" and "if it rains then I'll get wet"). An n-tuple, as used herein, is a set of "n" terms that co-occur (order independent) in a document. Further, a k-near n-tuple, as used herein, refers to a set of "n" terms that co-occur within a window of "k" terms in a document. Thus, an atom is generally defined as a generalization of all of the above. Implementations of embodiments of the present invention may use different varieties of atoms, but as used herein, atoms generally describes each of the above-described varieties.

When building the search index, each document is analyzed to identify atoms in the document and to generate a pre-computed score or rank for each atom that represents the atom's importance or relevance to the context of the documents. The search index stores information regarding the pre-computed scores generated for document/atom pairs, which are used during the funnel process.

Figure 2:
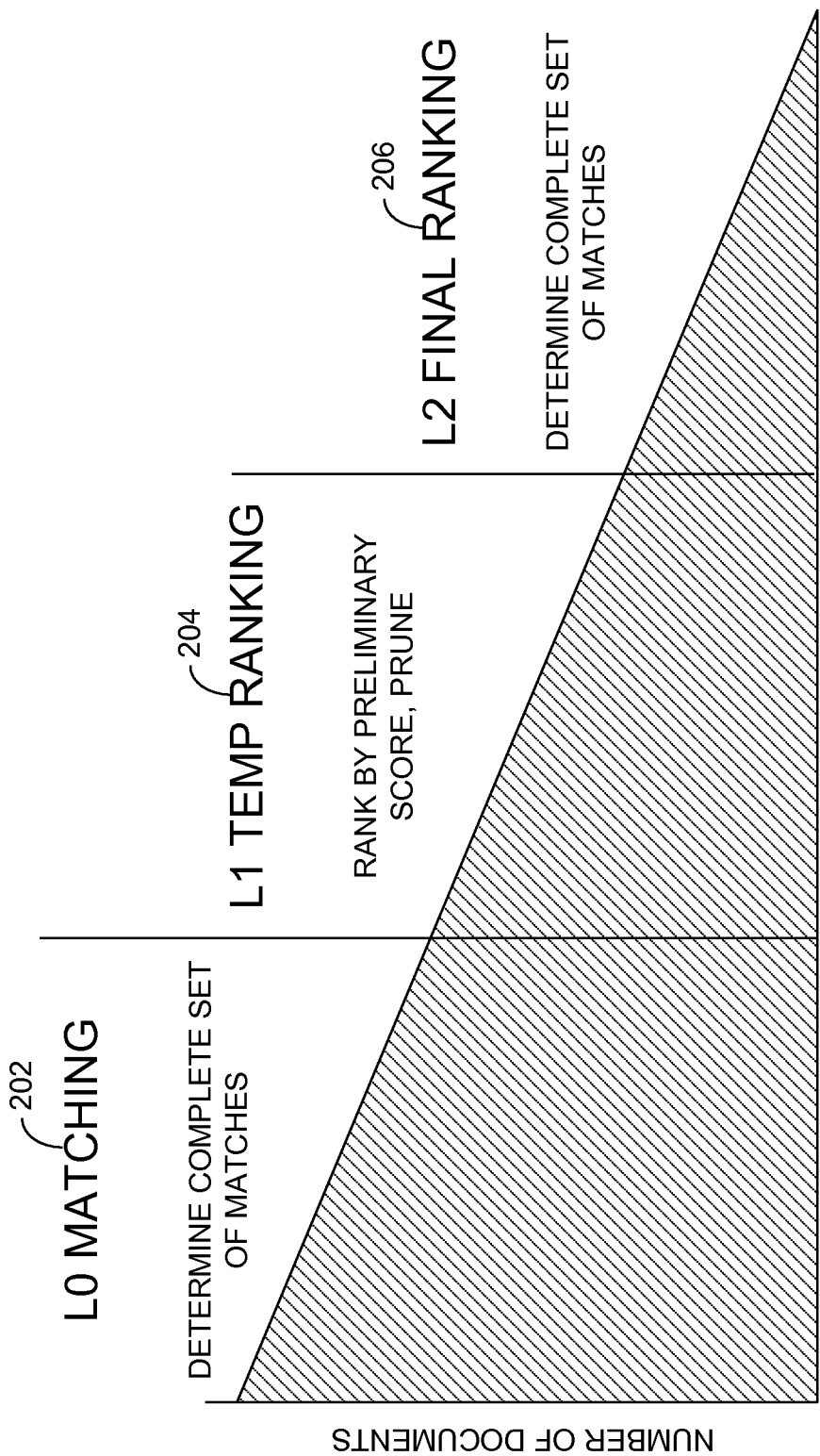
FIG. 2 is a diagram illustrating a smart funnel to reduce document candidates for retrieving a set of ranked documents in accordance with an embodiment of the present invention.

FIG. 2 illustrates the multiple stages of a funnel process in accordance with one embodiment of the present invention. The stages of the process shown in FIG. 2 are performed after a search query is received and include: an L0 matching stage 202, an L1 temporary ranking stage 204, and an L2 final ranking stage 206. As represented in FIG. 2, the number of candidate documents is reduced as the process progresses.

When a search query is received, the search query is analyzed to identify atoms. The atoms are used during the L0 matching stage 202 to query the search index and identify an initial set of matching documents that contain the atoms from the search query. As shown in FIG. 2, this may reduce the number of candidate documents from all documents indexed in the search index to those documents matching the atoms from the search query.

In the L1 temporary ranking stage 204, a simplified scoring function is used to compute a preliminary score for candidate documents retained from the L0 matching stage 202. The simplified scoring function operates on, among other things, the pre-computed scores stored in the search index for document/atom pairs. In some embodiments, the simplified scoring function may serve as an approximation of the final ranking algorithm that will ultimately be used to rank documents. However, the simplified scoring function provides a less expensive operation than the final ranking algorithm allowing for a larger number of candidate documents to be processed quickly. Candidate documents are pruned based on the preliminary score. For instance, only the top N documents having the highest preliminary scores may be retained.

In the L2 final ranking stage 206, the candidate documents retained from the L1 temporary ranking stage 204 are evaluated using a final ranking algorithm. The final ranking algorithm is a more expensive operation with a larger number of ranking features when compared with the simplified scoring function used during the L1 temporary ranking stage 204. However, the final ranking algorithm is applied to a much smaller number of candidate documents. The final ranking algorithm provides a set of ranked documents, and search results are provided in response to the original search query based on the set of ranked documents.

Accordingly, in one aspect, an embodiment of the present invention is directed to one or more computer storage media storing computer-useable instructions that, when used by a computing device, cause the computing device to perform a method. The method includes receiving a search query and reformulating the search query to identify one or more atoms. The method also includes identifying an initial set of documents from a search index based on the one or more atoms. The method further includes computing preliminary scores for each document in the initial set of documents using a simplified scoring function and pre-computed stores stored in the search index for document/atom pairs for the one or more atoms and the initial set of documents. The method also includes selecting a pruned set of documents from the initial set of documents based on the preliminary scores. The method further includes computing a ranking score for each document in the pruned set of documents using a full ranking algorithm to provide a set of ranked documents. The method still further includes providing search results for presentation to an end user based on the set of ranked documents.

In another embodiment of the present invention, as aspect is directed to a computerized system including at least one processor and one or more computer storage media. The system includes a query reformulation component that analyzes a received search query to identify one or more atoms based on terms contained in the received search query and generates a reformulated query. The system also includes a document matching component that queries a search index using the reformulated query to identify an initial set of matching documents. The system further includes a document pruning component that computes a preliminary score for each document from the initial set of matching documents using a simplified scoring function and identifies a pruned set of documents based on the preliminary scores. The system still further includes a final document ranking component that computes a ranking score for each document in the pruned set of documents using a full ranking algorithm.

A further embodiment of the present invention is directed to a method for providing search results in response to a search query using a staged process. The method includes receiving a search query and identifying one or more atoms from the search query. The method also includes identifying an initial set of documents containing the one or more atoms, computing a preliminary score for each document in the initial set of documents using a simplified scoring function, and selecting a subset of documents for further processing based on the preliminary scores. The method further includes computing a ranking score for each document in the subset of document using a final ranking algorithm. The method still further includes providing a set of search results based on the ranking scores.

Having described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 3:
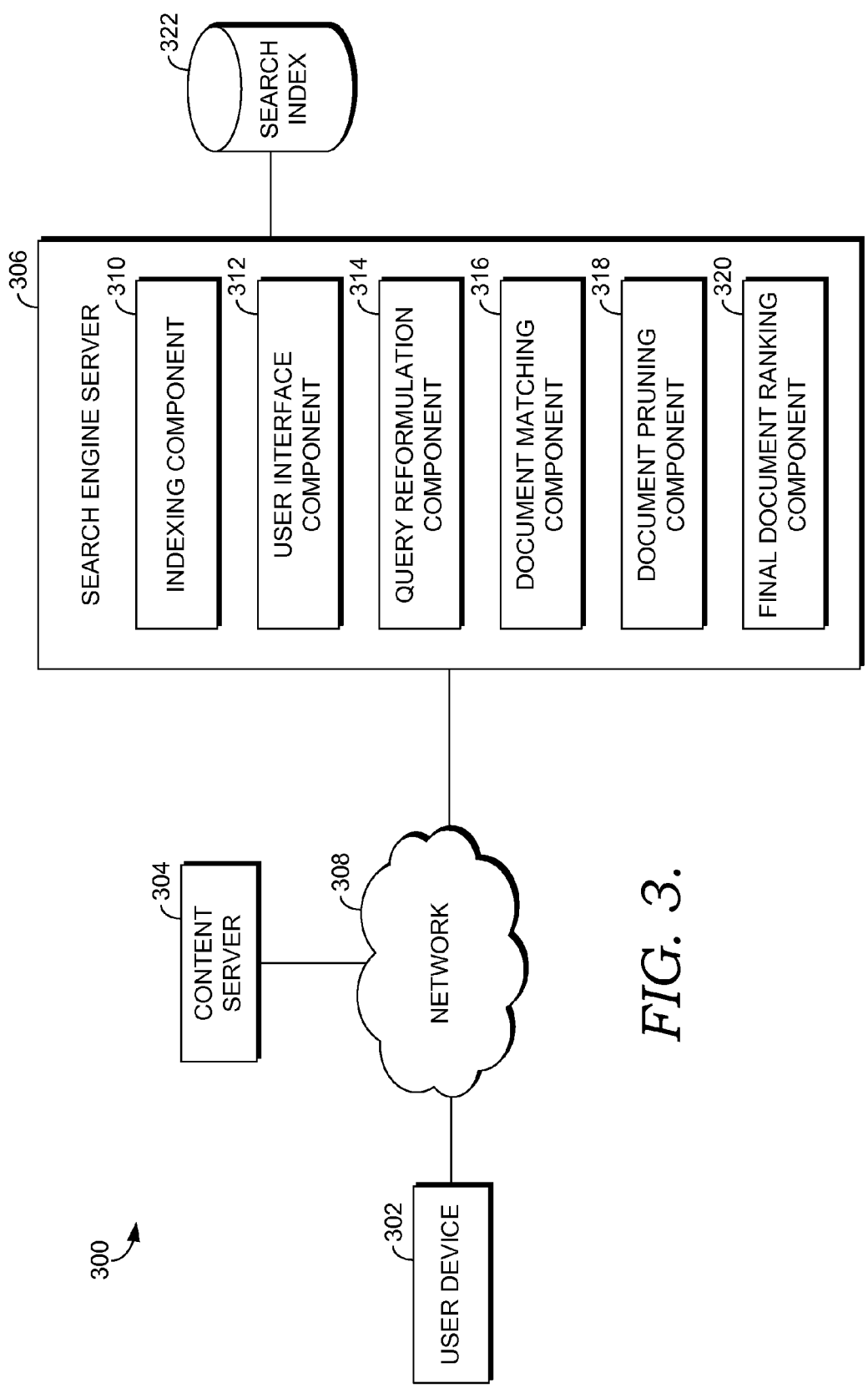
FIG. 3 is a block diagram of an exemplary system in which embodiments of the present invention may be employed.

Referring now to FIG. 3, a block diagram is provided illustrating an exemplary system 300 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 300 may include a user device 302, content server 304, and search engine server 306. Each of the components shown in FIG. 3 may be any type of computing device, such as computing device 100 described with reference to FIG. 1, for example. The components may communicate with each other via a network 308, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 300 within the scope of the present invention. Each may comprise a single device or multiple devices cooperating in a distributed environment. For instance, the search engine server 306 may comprise multiple devices arranged in a distributed environment that collectively provide the functionality of the search engine server 306 described herein. Additionally, other components not shown may also be included within the system 300.

The search engine server 306 generally operates to receive search queries from user devices, such as the user device 302, and to provide search results in response to the search queries.

The search engine server 306 includes, among other things, an indexing component 310, a user interface component 312, a query refinement component 314, a document matching component 316, a document pruning component 318, and a final document ranking component 320.

The indexing component 310 operates to index data regarding documents maintained by content servers, such as the content server 304. For instance, a crawling component (not shown) may be employed to crawl content servers and access information regarding documents maintained by the content servers. The indexing component 310 then indexes data regarding the crawled documents in the search index 322. In embodiments, the indexing component 310 indexes atoms found in documents and scoring information for documents in which each atom is found indicating the importance of the atom in the context of the document. Any number of algorithms may be employed to calculate a score for an atom found in a document. By way of example only, the score may be based on term-frequency inverse-document frequency (TF/IDF) functions as known in the art. For instance, the BM25F ranking function may be employed. The scores generated for document/atom pairs are stored as pre-computed scores in the search index 322

In embodiments, the indexing component 310 analyzes each document to identify terms, n-grams, and n-tuples and to determine which of these atoms should be indexed for the document. During processing of documents to be indexed, statistics about query distribution, term distribution, and/or the simplified scoring function to be used during the funnel process may be used to statistically select the best set of atoms to represent the document. These selected atoms are indexed in the search index 322 with the pre-computed scores, which allows for efficient pruning of documents early in the funnel process.

Although not required, in some embodiments of the present invention, the search index 322 may include both a reverse index (ordered by atom) and a forward index (ordered by document). The reverse index may include a number of posting lists, each posting list being directed to an atom and listing documents containing the atom with the pre-computed score for each document/atom pair. As will be described in further detail below, the reverse index and forward index may be employed at different stages of the funnel process.

The user interface component 312 provides an interface to user devices, such as the user device 302, that allows users to submit search queries to the search engine server 306 and to receive search results from the search engine server 306. The user device 302 may be any type of computing device employed by a user to submit search queries and receive search results. By way of example only and not limitation, the user device 302 may be a desktop computer, a laptop computer, a tablet computer, a mobile device, or other type of computing device. The user device 302 may include an application that allows a user to enter a search query and submit the search query to the search engine server 306 to retrieve search results. For instance, the user device 302 may include a web browser that includes a search input box or allows a user to access a search page to submit a search query. Other mechanisms for submitting search queries to search engines are contemplated to be within the scope of embodiments of the present invention.

When a search query is received via the user interface component 312, the query reformulation component 314 operates to reformulate the query. The query is reformulated from its free text form into a format that facilitates querying the search index 322 based on how data is indexed in the search index 322. In embodiments, the terms of the search query are analyzed to identify atoms that may be used to query the search index 322. The atoms may be identified using similar techniques that were used to identify atoms in documents when indexing the documents in the search index 322. For instance, atoms may be identified based on the statistics of terms and query distribution information. The query reformulation component 314 may provide a set of conjunction of atoms and cascading variants of these atoms.

The document matching component 316 employs the reformulated query to query the search index 322 and identify a set of matching documents. For instance, the reformulated query may include two or more atoms and the document matching component 316 may retrieve the intersection of those atoms' posting lists to provide an initial set of matching documents.

The document pruning component 318 operates by pruning documents from the initial set of matching documents. This may include computing a preliminary score for each document from the initial set of matching documents using the pre-computed scores stored in the search index 322 for document/atom pairs. The preliminary score may be based on a simplified scoring function that is tuned for performance and recall. In some embodiments, the simplified scoring function used to generate the preliminary score is built based on the full ranking algorithm that is subsequently used to provide a final set of ranked documents. As such, the simplified scoring function serves as an approximation of the final ranking algorithm. For instance, an approach such as that described in U.S. patent application Ser. No. 13/932,866, entitled "DECOMPOSABLE RANKING FOR EFFICIENT PRE-COMPUTING" may be employed for building the simplified scoring function. In some embodiments, the simplified scoring function contains a subset of the ranking features from the final ranking algorithm.

A number of different approaches may be used by the document pruning component 318 to prune the initial set of documents. In some embodiments, the document pruning component 318 may retain a predetermined number of matches from the initial set of documents while removing other documents from consideration (i.e., the top N matches). For instance, the document pruning component 318 may retain a thousand documents having the highest preliminary scores. The number of matches retained by the document pruning component 318 may be based on the fidelity confidence of the simplified scoring function used to generate the preliminary scores. The fidelity confidence represents the ability of the simplified scoring function to provide a set of documents that matches the set of documents that would be provided by the full ranking algorithm. For instance, it may take, on average, 1200 documents from the simplified scoring function to get the top 1000 documents that would be provided by the final ranking algorithm. In other embodiments, instead of retaining a predetermined number of documents, the document pruning component 318 may retain documents having a preliminary score above a certain threshold.

In some embodiments, the document matching component 316 and the document pruning component 318 may be closely coupled such that the document matching and pruning are combined into a single process for multiple iterations. For instance, preliminary scores may be computed as matching documents are identified and used to remove documents that would be very likely to be rejected by the full ranking algorithm.

In some embodiments, a search index using tiered posting lists such as that described in U.S. patent application Ser. No. 12/951,799, entitled "TIERING OF POSTING LISTS IN SEARCH ENGINE INDEX" may be employed to facilitate this matching/pruning process. Each posting list would be associated with a given atom and would include tiers ordered based on pre-computed scores assigned to documents representing the relevance of the given atom to the context of each document. Within each tier, the postings may be internally ordered by document. Using such a search index, the document matching component 314 could retrieve an initial set of documents using a first tier (having the highest pre-computed scores) and prune the initial set of documents using the simplified scoring function. If a sufficient number of documents are provided, the matching/pruning process may end. Alternatively, if a sufficient number of documents are not provided, matching and pruning may be iteratively performed on lower level tiers until a sufficient number of documents are retained.

The set of documents retained by the matching and pruning process provided by the document matching component 316 and the document pruning component 318 are evaluated by the final document ranking component 320 to provide a final set of ranked documents. The final document ranking component 320 employs a full ranking algorithm that may operate on the original search query and the set documents retained by the matching and pruning process. The full ranking algorithm employs more ranking features and more data from the documents than was used by the simplified scoring function employed during the pruning process. As such, the full ranking algorithm is a more expensive operation that requires more processing and takes a longer period of time to compute. However, because the set of candidate documents has been pruned, the full ranking algorithm is performed on a smaller set of documents.

The final document ranking component 320 provides a final set of ranked documents, which are indicated to the user interface component 312. The user interface component 312 then communicates search results that include at least a portion of the final set of ranked documents to the user device 302. For instance, the user interface component 312 may generate or otherwise provide a search engine results page (SERP) listing search results based on the final set of ranked documents.

Turning next to FIG. 4, a flow diagram is provided that illustrates an overall method 400 for employing a staged process to return search results to a search query in accordance with an embodiment of the present invention. The staged process begins with a pre-compute/index stage, as shown at block 402. This stage is an offline phase, that is, it is performed separate from any received search query. In the pre-compute/index stage 402, documents are crawled and data regarding the documents are indexed in a search index. A process for indexing document data during the pre-computer/index stage 402 in accordance with one embodiment is discussed in further detail below with reference to FIG. 5.

The stages shown in FIG. 4 after the pre-compute/index stage 402 comprise an online phase, in which a search query is received and search results are returned in response. The first stage of the online phase is a matching stage, as shown at block 404. During the matching stage 404, a search query is received and reformulated, and the reformulated query is used to identify matching documents from the search index. A process for identifying matching documents during the matching stage 404 in accordance with one embodiment is discussed in further detail below with reference to FIG. 6.

The next stage after matching is a pruning stage, as shown at block 406. The pruning stage 406 takes the initial set of documents from the matching stage 404 and determines a preliminary score for each document using a simplified scoring function. Based on the preliminary score, documents are pruned from the initial set of documents. A process for pruning documents from the initial set of matching documents in accordance with one embodiment is discussed in further detail below with reference to FIG. 7.

In some embodiments, the matching stage 404 and pruning stage 406 may be interleaved. In particular, pruning may be performed as matching documents are identified to early reject candidates from further consideration where the preliminary score indicates that the documents would be very likely rejected by the final ranking algorithm.

The set of candidate documents retained after the matching stage 404 and the pruning stage 406 are further evaluated during a final ranking stage, as shown at block 408. During the final ranking stage 408, a full ranking algorithm is employed to determine a final score for the retained documents. In some embodiments, the full ranking algorithm may be performed over the original search query and data for each of the retained documents. The full ranking algorithm may employ a number of different ranking features to determine the final set of ranked documents. Search results are provided in response to the search query based on the final set of ranked documents, as shown at block 410.

Turning now to FIG. 5, a flow diagram is provided that illustrates a method 500 for pre-computing scores for document/atom pairs and indexing data in accordance with an embodiment of the present invention. Initially, a document is accessed, as shown at block 502. For instance, a crawler may be employed to crawl a document and retrieve document data. The document is processed at block 504. The document is processed to identify atoms contained within the document. As noted above, the process may include analyzing the text of the document to identify terms, n-grams, and n-tuples and to determine which of these atoms should be indexed for the document. Statistics about query distribution, term distribution, and/or the simplified scoring function to be used during the funnel process may be used to statistically select the best set of atoms to represent the document.

A score is generated for each atom identified within the document, as shown at block 506. The score represents the importance of the atom in the context of the document. Any number of algorithms may be employed to calculate a score for an atom found in a document. By way of example only, the score may be based on term-frequency inverse-document frequency (TF/IDF) functions as known in the art. For instance, the BM25F ranking function may be employed.

Data is indexed in a search index, as shown at block 508. This may include storing information regarding atoms found in the document and the score for each document/atom pair. These scores comprise pre-computed scores that may be used during the funnel process. In some embodiments, posting lists are created for each atom. Each posting list may include a list of the documents containing the atom and an indication of the pre-computed score for each document/atom pair.

Referring next to FIG. 6, a flow diagram is provided that illustrates a method 600 for retrieving an initial set of matching documents during a matching phase in accordance with an embodiment of the present invention. As shown at block 602, a search query is initially received. The search query may contain one or more search terms entered by a user employing a user device.

The received search query is reformulated, as shown at block 604. In particular, the terms of the search query are analyzed to identify one or more atoms that may be used to query the search index. This analysis may be similar to the analysis used to identify atoms in documents when indexing document data. For instance, statistics of terms and search queries may be employed to identify atoms in the search query. The reformulated query may comprise a set of conjunction of atoms and cascading variants of these.

The reformulated query is used to identify a set of matching documents from the search index, as shown at block 606. In particular, the atoms identified from the original query are used to query the search index and identify matching documents. As indicated above, the search index may comprise posting lists for various atoms identified in indexed documents. The posting lists corresponding with atoms identified by the reformulated query may be identified and used to identify matching documents. For instance, the intersection of posting lists for multiple atoms from the reformulated query may provide the initial set of matching documents.

Turning to FIG. 7, a flow diagram is provided that illustrates a method 700 for pruning documents from an initial set of matching documents during a pruning stage in accordance with an embodiment of the present invention. As shown at block 702, a preliminary score is computed for each document using pre-computed scores stored in the search index. This may include retrieving the pre-computed scores for a document for each atom and using the pre-computed scores in a simplified scoring function to generate a preliminary score for the document. The simplified scoring function may be established in a manner such that it provides an estimate of the final score that would be provided by a full ranking algorithm. For instance, the simplified scoring function may include a subset of the features used by the full ranking algorithm. In some embodiments, the simplified scoring function is defined using a process such as that described by U.S. patent application Ser. No. 13/932,866, entitled "DECOMPOSABLE RANKING FOR EFFICIENT PRECOMPUTING."

Documents are pruned from the initial set of matching documents based on the preliminary scores, as shown at block 704. In some embodiments, the top N documents are retained, that is, the N documents having the highest preliminary score are retained for further processing. The number of documents retained may be based on the fidelity of the simplified scoring function used to compute the preliminary scores. The fidelity of the simplified scoring function represents that ability of the simplified scoring function to provide a ranked set of documents similar to what would be provided by the final ranking algorithm. If the correlation between the simplified scoring function and the final ranking algorithm including the error in the simplified scoring function is known, the knowledge could be used to determine the number of documents to retain from the pruning stage. For instance, if it is desired to provide 1000 search results and it is known that, on average over all queries, the top 1200 documents from the simplified scoring function will include the top 1000 documents from the final ranking algorithm, the top 1200 documents will be retained from the pruning stage.

In some embodiments of the present invention, the funnel process may employ a search index that includes a reverse index and a forward index. The reverse index would be ordered by atom. This would facilitate fast retrieval of data during the matching and pruning stages of the funnel process. In particular, when a search query is received and atoms from the search query are identified, the posting lists in the reverse index corresponding with the atoms identified from the search query may be quickly accessed and used to identify matching documents and retrieve the pre-computed scores used by the simplified scoring function. The forward index would be ordered by document. This would facilitate the final ranking stage of the funnel process. In particular, a pruned set of documents would be provided as a result of the matching and pruning stages. The pruned set of documents would be relatively small. As such, the forward index would store document data that would be retrieved for the documents in the pruned set of documents and used by the final ranking algorithm to provide the final set of ranked documents. In some embodiments, the forward index may be structured as described in U.S. patent application Ser. No. 12/951,747, entitled "EFFICIENT FORWARD RANKING IN A SEARCH ENGINE." Additionally, in some embodiments, a hybrid distribution model may be employed for the reverse and forward index such as that described in U.S. patent application Ser. No. 12/951,815, entitled "HYBRID DISTRIBUTION MODEL FOR SEARCH ENGINE INDEXES" (which is herein incorporated by reference in its entirety).

As can be understood, embodiments of the present invention provide a matching funnel process for returning search results to a search query by employing more expensive computations in subsequent stages to prune away candidate documents. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more tangible computer storage media storing computer-useable instructions that, when used by a computing device, cause the computing device to perform a method comprising:

receiving a search query;

reformulating the search query to identify one or more atoms used to query a search index, the search index storing a plurality of atoms, the plurality of atoms comprising one or more n-grams, one or more n-tuples, and one or more near n-tuples;

identifying an initial set of documents from the search index based on the one or more atoms identified in the reformulated search query;

computing preliminary scores for each document in the initial set of documents using both a simplified scoring function and pre-computed scores stored in the search index for document/atom pairs for the one or more atoms and the initial set of documents, wherein a pre-computed score for each document/atom pair represents the importance of an atom extracted from the document, and wherein the simplified scoring function is derived at least in part from ranking features of a full ranking algorithm;

selecting a pruned set of documents from the initial set of documents based on the preliminary scores;

computing a ranking score for each document in the pruned set of documents using the full ranking algorithm different from the simplified scoring function to provide a set of ranked documents; and providing search results for presentation to an end user based on the set of ranked documents.

2. The one or more computer storage media of claim 1, wherein reformulating the search query to identify the one or more atoms comprises analyzing the search query to identify the one or more atoms using techniques employed to identify atoms in documents when generating the search index.

3. The one or more computer storage media of claim 1, wherein identifying the initial set of documents from the search index comprises identifying a posting list corresponding with each of the one or more atoms and identifying documents from each posting list.

4. The one or more computer storage media of claim 1, wherein the simplified scoring function is based on the full ranking algorithm.

5. The one or more computer storage media of claim 4, wherein the simplified scoring function includes a subset of the ranking features used by the full ranking algorithm.

6. The one or more computer storage media of claim 1, wherein selecting the pruned set of documents from the initial set of documents comprises selecting a predetermined number of documents having the highest preliminary scores.

7. The one or more computer storage media of claim 6, wherein the predetermined number of documents is based on a fidelity confidence for the simplified scoring function.

8. The one or more computer storage media of claim 1, wherein selecting the pruned set of documents from the initial set of documents comprises selecting documents having a preliminary score above a preliminary score threshold.

9. The one or more computer storage media of claim 1, wherein the search index includes a reverse index and a forward index, and wherein the initial set of documents are identified using the reverse index, the preliminary scores for the initial set of documents are computed using the reverse index, and the ranking scores for the set of ranked documents are computed using the forward index.

10. The one or more computer storage media of claim 1, wherein identifying the initial set of documents, computing preliminary scores, and selecting the pruned set of documents comprises an iterative process of identifying documents, computing preliminary scores, and selecting documents for the pruned set of documents until a threshold number of documents has been selected for the pruned set of documents.

11. A computerized system including at least one processor and one or more computer storage media, the system including:
 a query reformulation component that analyzes a received search query to identify one or more atoms based on terms contained in the received search query and generates a reformulated query;
 a document matching component that queries a search index using the reformulated query to identify an initial set of matching documents, the search index storing a plurality of atoms, the plurality of atoms comprising one or more n-grams, one or more n-tuples, and one or more near n-tuples;
 a document pruning component that computes a preliminary score for each document from the initial set of matching documents using both a simplified scoring function and pre-computed scores stored in the search index for document/atom pairs for the one or more atoms and the initial set of documents, and identifies a pruned set of documents based on the preliminary scores; and
 a final document ranking component that computes a ranking score for each document in the pruned set of documents using a full ranking algorithm.

12. The computerized system of claim 11, wherein the system further comprises an indexing component that indexes document data in the search index by analyzing documents to identify atoms in the documents, calculating pre-computed scores for document/atom pairs, and generating posting lists for atoms, wherein each posting list corresponds with a given atom and identifies a pre-computed score for documents containing the given atom.

13. The computerized system of claim 12, wherein the query reformulation component identifies the one or more atoms from the received search query using techniques employed by the indexing component to identify atoms in the documents.

14. The computerized system of claim 11, wherein the simplified scoring function is based on the full ranking algorithm.

15. The computerized system of claim 14, wherein the simplified scoring function includes a subset of the ranking features used by the full ranking algorithm.

16. The computerized system of claim 11, wherein the document pruning component selects the pruned set of documents from the initial set of documents by selecting a predetermined number of documents having the highest preliminary scores, wherein the predetermined number of documents is based on a fidelity confidence for the simplified scoring function.

17. The computerized system of claim 11, wherein the search index includes a reverse index and a forward index, and wherein the initial set of documents are identified by the document matching component using the reverse index, the preliminary scores for the initial set of documents are computed by the document pruning component using the reverse index, and the ranking scores for the set of ranked documents are computed by the final document ranking component using the forward index.

18. A method for providing search results in response to a search query using a staged process comprising:
 receiving a search query;
 identifying one or more atoms from the search query;
 identifying an initial set of documents containing the one or more atoms from a search index, the search index storing a plurality of atoms, the plurality of atoms comprising one or more n-grams, one or more n-tuples, and one or more near n-tuples;
 computing a preliminary score for each document in the initial set of documents using both a simplified scoring function and pre-computed scores stored in the search index for document/atom pairs for the one or more atoms and the initial set of documents;
 selecting a subset of documents for further processing based on the preliminary scores;
 computing a ranking score for each document in the subset of documents using a final ranking algorithm; and
 providing a set of search results based on the ranking scores.

19. The method of claim 18, wherein the simplified scoring function is based on the full ranking algorithm and includes a subset of the ranking features used by the full ranking algorithm.

20. The one or more computer storage media of claim 18, wherein selecting the subset of documents for further processing based on the preliminary scores comprises selecting a predetermined number of documents having the highest preliminary scores, wherein the predetermined number of documents is based on a fidelity confidence for the simplified scoring function.

* * * * *